US012776606B2

(12) United States Patent
Caviness

(10) Patent No.: US 12,776,606 B2
(45) Date of Patent: Oct. 27, 2026

(54) DEVICE FOR PROVIDING ENHANCED PERFORMANCE DURING ASSEMBLY AND/OR OPERATION OF A HARDLINE CONNECTOR

(71) Applicant: PPC BROADBAND, INC., East Syracuse, NY (US)

(72) Inventor: Jordan Caviness, Liverpool, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 493 days.

(21) Appl. No.: 18/198,668

(22) Filed: May 17, 2023

(65) Prior Publication Data

US 2023/0378688 A1 Nov. 23, 2023

Related U.S. Application Data

(60) Provisional application No. 63/342,991, filed on May 17, 2022.

(51) Int. Cl.
*H01R 13/621* (2006.01)
*H01R 13/59* (2006.01)

(52) U.S. Cl.
CPC ......... *H01R 13/6215* (2013.01); *H01R 13/59* (2013.01); *H01R 2201/18* (2013.01)

(58) Field of Classification Search
CPC H01R 13/6215; H01R 13/59; H01R 2201/18; H01R 9/0521; H01R 4/5025; H01R 24/44
(Continued)

(56) References Cited

U.S. PATENT DOCUMENTS 5,352,134 A * 10/1994 Jacobsen .............. H01R 9/0521 439/583
5,417,588 A 5/1995 Olson et al.
(Continued)

FOREIGN PATENT DOCUMENTS

CN 202839992 U * 3/2013 ........... H01R 9/0521
CN 214706336 U 11/2021
(Continued)

OTHER PUBLICATIONS

International Search Report and Written Opinion dated Sep. 5, 2023 in corresponding International Application No. PCT/US2023/022564, 19 pages.
(Continued)

*Primary Examiner* — Tulsidas C Patel
*Assistant Examiner* — Jeffrey Mountain
(74) *Attorney, Agent, or Firm* — MH2 TECHNOLOGY LAW GROUP LLP

(57) ABSTRACT

A connector seizure member for providing a connector with enhanced mechanical performance during assembly and/or operation may include a seizure member having a forward facing surface that includes an forward extending housing engaging portion that is configured to be received in an seizure member engaging portion in an inner wall of a first connector assembly portion before a second housing portion is threadedly coupled with the first connector assembly portion so as to prevent the seizure member from becoming marred or deformed by being rotating relative to the first connector assembly portion when the second housing portion is threadedly coupled with the first connector assembly portion and enhance mechanical performance of the connector during assembly and/or operation of the hardline connector.

42 Claims, 9 Drawing Sheets

(58) Field of Classification Search
USPC .......................................................... 439/133
See application file for complete search history.

(56) References Cited

U.S. PATENT DOCUMENTS

| | | | | |
|---|---|---|---|---|
| 5,586,910 | A | 12/1996 | Del Negro et al. | |
| 6,019,636 | A * | 2/2000 | Langham | H01R 9/0521 439/583 |
| 6,729,912 | B2 | 5/2004 | D'Addario | |
| 7,635,283 | B1 | 12/2009 | Islam | |
| 7,887,365 | B1 | 2/2011 | Orner et al. | |
| 7,934,955 | B1 | 5/2011 | Hsia | |
| 8,727,807 | B2 | 5/2014 | Sykes et al. | |
| 10,396,510 | B1 | 8/2019 | Wagner et al. | |
| 10,931,051 | B2 | 2/2021 | Wang et al. | |
| 11,588,285 | B2 | 2/2023 | Blasick et al. | |
| 2004/0137778 | A1 | 7/2004 | Mattheeuws et al. | |
| 2011/0252642 | A1 | 10/2011 | Montena | |
| 2012/0252265 | A1 * | 10/2012 | Wild | H01R 24/564 439/578 |
| 2017/0133772 | A1 * | 5/2017 | Paynter | H01R 9/0521 |

FOREIGN PATENT DOCUMENTS

| | | | |
|---|---|---|---|
| DE | 60305146 | T2 | 3/2007 |
| EP | 1455420 | B1 | 9/2004 |
| EP | 2190069 | B1 | 5/2010 |
| EP | 2587590 | B1 | 5/2013 |
| EP | 3815190 | A0 | 5/2021 |
| EP | 3926763 | A1 | 12/2021 |
| ES | 2264512 | T3 | 1/2007 |
| FR | 2224894 | A1 | 10/1974 |
| GB | 1416133 | A | 12/1975 |
| GB | 2448595 | A | 10/2008 |
| WO | 2020020109 | A1 | 1/2020 |

OTHER PUBLICATIONS

"Interface A Bushing Deadbreak Connectors 250AMP 7.9MM Pin Type Screened Separable Connectors," Prysmian Group, Thorne & Derrick International, 10 pages [retrieved on Nov. 20, 2024]. Retrieved from the Internet: URL: <https://www.powerandcables.com/product/product-category/interfacea-bushing-connectors/>.

* cited by examiner

DEVICE FOR PROVIDING ENHANCED PERFORMANCE DURING ASSEMBLY AND/OR OPERATION OF A HARDLINE CONNECTOR

CROSS-REFERENCE TO RELATED APPLICATIONS

This application claims the benefit of U.S. Provisional Application No. 63/342,991, filed May 17, 2022, the disclosure of which is hereby incorporated by reference herein in its entirety.

This application is related to U.S. patent application Ser. No. 18/081,504, filed Dec. 14, 2022, U.S. Provisional Application No. 63/289,625, filed Dec. 14, 2021, and U.S. Provisional Application No. 63/361,391, filed Dec. 15, 2021, the disclosures of which are hereby incorporated by reference herein in their entirety.

BACKGROUND

The present invention relates generally to connectors for terminating coaxial cable. More particularly, the present invention relates to axially compressible connectors for hardline or semi-rigid coaxial cables.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

The hardline cable includes a solid wire core or inner conductor, typically of copper or copper-clad aluminum, surrounded by a solid tubular outer conductor. The outer conductor is also usually made of copper or aluminum. Dielectric material or insulation separates the inner and outer conductors. The outer conductor is covered with a cable jacket or sheath of plastic to provide protection against corrosion and weathering.

Threaded cable connectors, as shown in U.S. Pat. Nos. 5,352,134 and 6,019,636, have been employed to provide more even compression of the connector. Such connectors typically utilize some form of clamping mechanism that radially compresses the outer conductor of the cable against a tubular mandrel upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve typically closes the full length of the mechanism with equal forces around the circumference of the mandrel. The resulting forces closing down on the coaxial cable compress the cable around the outside of the mandrel creating a formed bond on the outside surface.

The ability of a connector to make a solid ground connection to the outer sheath of hardline CATV cables has always been required to achieve long term performance with respect to RFI shielding effectiveness of the connector as well as facilitate proper signal transmission through the connector with minimal loss or disruption of said signal. Connectors throughout the CATV industry have been made with all metal mandrel support sleeves and also have been made with all plastic mandrel support sleeves. While all-metal versions may hold up very well strength wise over time and temperature, the all-plastic versions are susceptible to creep and can weaken over time and temperature.

Some conventional hardline coaxial cable connectors experience less than desirable electrical performance resulting from poor return loss performance. The return loss performance can be degraded by mismatched impedance or reflection, particularly at the front end of hardline connectors. Outside diameter changes of the collet portion and inside diameter changes of the front body surrounding the collet portion cause impedance changes along the connector, which in turn hurts return loss performance of the connector.

For example, the industry standard for electrical performance of hardline connectors is-25 dB return loss over a frequency range of 5 MHz to 1794 MHz. Before that, the industry standard was-30 dB return loss over a frequency range of 5 MHz to 1002 MHz or 5 MHz to 1218 MHz. However, the continually increasing demand for more bandwidth for signal transmissions over copper wire has led to a desire to provide hardline connectors capable of improved electrical performance across a wider frequency bandwidth, for example, a bandwidth of 5 MHz to 3 GHz or greater. Until now, persons of ordinary skill in the art were not able to achieve such improved electrical performance at the wider bandwidth extending to 3 GHz or greater.

In the case of conventional hardline connectors (e.g., one piece, two piece, and three piece), as signals are transmitted over a wider frequency bandwidth, electrical performance of such connectors degrades. Consequently, persons of ordinary skill in the art thought that it was not possible to provide hardline connectors (e.g., one piece, two piece, or three piece) that could be configured to achieve satisfactory electrical performance (e.g., −20 dB or better) over a wider frequency bandwidth of 5 MHz to 3 GHz or greater.

It may be desirable to provide a hardline connector that overcomes one or more of the aforementioned disadvantages of hardline connectors. That is, it may be desirable to provide a hardline connector having improved return loss performance over a wider frequency bandwidth without degrading other performance of the connector, such as electrical, mechanical, and environmental performance. For example, it may be desirable to provide a hardline connector that is configured to achieve a return loss of −20 dB or better over a frequency range of 5 MHz to 3 GHz or greater, but persons of ordinary skill in the art have not been able to do so. Similarly, it may be desirable to provide a hardline connector that is configured to achieve a return loss of −30 dB to −35 dB over a frequency range of 5 MHz to 3 GHz or greater, but persons of ordinary skill in the art have not been able to do. Further, it may be desirable to provide a hardline connector that is configured to achieve a return loss of −20 dB or better over a frequency range of 5 MHz to 6 GHZ, but persons of ordinary skill in the art have not been able to do so.

It may be desirable to provide a hardline connector having components and geometrical features designed to achieve high levels of return loss performance, but persons of ordinary skill in the art have not been able to do. It may be desirable to eliminate areas within the connector having impedance levels that deviate significantly from 75 ohms (above or below) by bring the peaks and valleys of such impedance levels closer to 75 ohms, but persons of ordinary skill in the art have not been able to do.

It may be desirable to provide a hardline connector having a mid-body assembly that includes a seizure bushing that is configured to be rotatingly fixed with a front body assembly before the mid-body assembly is threadedly coupled with the front body assembly such that the seizure member is prevented from rotating relative to the front body assembly when the mid-body assembly is being threadedly coupled with the front body assembly so as to prevent marring and/or deformation of an engagement portion of the seizure bushing and enhance mechanical performance of the connector.

SUMMARY

In accordance with an embodiment of the present disclosure, a hardline connector configured to provide enhanced mechanical performance may include a first assembly configured to be threadedly coupled with an interface port, a second assembly configured to be threadedly coupled with the first assembly and a third assembly configured to be threadedly coupled with a rearward end of the second housing. The first assembly may include a first housing, a gripping portion, and a nonconductive insulator configured to electrically insulate the gripping portion from the first housing, the first housing may be configured to house at least a portion of the gripping portion and the insulator, and the gripping portion may include a first end configured to extend through the insulator and extend from a forward end of the first housing and a gripping end configured to receive a center conductor of a hardline coaxial cable. The second assembly may include a second housing having a forward end configured to be threadedly coupled with a rearward end of the first housing and a rearward end configured to receive the hardline coaxial cable, and the second housing may be configured to house and retain at least a portion of a nonconductive seizure member. The nonconductive seizure member may be configured to compress the gripping end of the gripping portion when the second housing is threadedly coupled with the first housing, and the seizure member may be configured to be rotatingly fixed with the first assembly before the seizure member radially compresses the gripping end of the gripping portion onto a center conductor received in the gripping end. The third assembly may include a back nut having a forward end configured to be threadedly coupled with a rearward end of the second housing and configured to receive the hardline coaxial cable. A forward facing surface of the seizure member may include a housing engaging portion that extends in the forward direction and is configured to be received in a seizure member engaging portion in an inner wall of the first housing before the second housing is threadedly coupled with the first housing such that the seizure member is prevented from rotating relative to the first housing when the second housing is being threadedly coupled with the first housing so as to prevent marring and/or deformation of the housing engaging portion and enhance mechanical performance of the connector during assembly and/or operation of the hardline connector.

In some embodiments, the housing engaging portion may comprise a fin portion, and the seizure member engaging portion may comprise a longitudinal groove.

In one or more of the above embodiments, the housing engaging portion may comprise two diametrically arranged fin portions, and the seizure member engaging portion may comprise two longitudinal grooves configured to receive the two diametrically arranged fin portions.

In one or more of the above embodiments, the forward facing surface of the seizure member may include an additional housing engaging portion extending in the forward direction and being configured to be received in the seizure member engaging portion in the inner wall of the first housing after the second housing is threadedly coupled with the first housing such that the seizure bushing is prevented from rotating relative to the first housing.

In one or more of the above embodiments, the seizure member may comprise a seizure bushing.

In one or more of the above embodiments, the first assembly may comprise a front body assembly, the gripping portion may comprise a collet portion, the second assembly may comprise a mid-body assembly, and the third assembly comprises a back nut assembly.

In one or more of the above embodiments, the insulator may include radially spaced apart inner and outer cylindrical walls connected to one another at a forward end by a radial wall and radially extending ribs between the inner and outer cylindrical walls configured to provide radial strength to the insulator; the insulator may extend from a rearward facing surface of an end wall at the forward end of the first housing to a forward facing surface at a forward end of the gripping end of the gripping portion; the second assembly may include a split tube clamp radially surrounding a portion of a conductive metal mandrel and a tubular ramp radially surrounding at least a portion of the clamp; the third assembly may include a seal driver and an O-ring; the ramp may be configured to be moved forward relative to the clamp when the back nut is threadedly coupled with the second housing such that the ramp and the clamp are configured to engage one another, thereby causing the clamp to radially compress an outer conductor of the hardline coaxial cable onto the tubular conductive metal mandrel; and the seal driver may be configured to be urged in a rearward direction relative to the back nut when the back nut is threadedly coupled with the second housing so as to compress the first O-ring to provide a seal between the back nut and the hardline coaxial cable.

In one or more of the above embodiments, the hardline connector may be configured to improve return loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve a return loss of −30 dB to −35 dB or better over a frequency range of 3 MHz to 5 GHz and a return loss of −20 dB or better over a frequency range of 5 MHz to 6 GHz.

In one or more of the above embodiments, the hardline connector may be configured to improve insertion loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve an insertion loss of −0.15 dB or better over a frequency range of 3 MHz to 5 GHz and an insertion loss of −0.2 dB or better over a frequency range of 5 MHz to 6 GHz.

In accordance with another embodiment of the present disclosure, a connector configured to provide enhanced mechanical performance during assembly and/or operation of the hardline connector may include a first assembly configured to be threadedly coupled with an interface port and a second assembly configured to be threadedly coupled with the first assembly. The first assembly may include a first assembly housing and a gripping portion housed in at least a portion of the first assembly housing, and the gripping portion may include a gripping end portion configured to receive at least a portion of a center conductor of a hardline coaxial cable. The second assembly may include a second assembly housing having a second assembly forward end portion configured to be threadedly coupled with a rearward first housing end portion of the first assembly housing and a second assembly rearward end portion configured to receive the hardline coaxial cable, and the second assembly housing may be configured to house and retain at least a portion of a nonconductive seizure member. The nonconductive seizure member may be configured to compress the gripping end of the gripping portion when the second assembly housing is threadedly coupled with the first assembly housing, and the seizure member may be configured to be rotatingly fixed with the first assembly before the seizure member radially compresses the gripping end of the gripping portion onto a center conductor received in the gripping end. A forward facing surface of the seizure member may include a housing engaging portion extending in the forward direction and being configured to be received in a longitudinally extending seizure member engaging portion of the first assembly housing before the second assembly housing is threadedly coupled with the first assembly housing such that the seizure member is prevented from rotating relative to the first assembly housing when the second assembly housing is being threadedly coupled with the first assembly housing so as to prevent marring and/or deformation of the housing engaging portion and enhance mechanical performance of the connector during assembly and/or operation of the connector.

In one or more of the above embodiments, the housing engaging portion may comprise a fin portion, and the seizure member engaging portion may comprise a longitudinal groove portion.

In one or more of the above embodiments, the housing engaging portion may comprise two diametrically arranged fin portions, and the seizure member engaging portion may comprise two longitudinal groove portions configured to receive the two fin portions.

In one or more of the above embodiments, the forward facing surface of the seizure member may include an additional housing engaging portion extending in the forward direction and being configured to be received in the seizure member engaging portion in the inner wall of the first assembly housing after the second assembly housing is threadedly coupled with the first assembly housing such that the seizure bushing is prevented from rotating relative to the first assembly housing.

In one or more of the above embodiments, the seizure member may comprise a seizure bushing.

In one or more of the above embodiments, wherein the first assembly may comprise a front body assembly, the gripping portion may comprise a collet portion, and the second assembly may comprise a mid-body assembly.

In one or more of the above embodiments, wherein the nonconductive seizure member may be configured to compress the gripping end of the gripping portion when the second assembly housing is threadedly coupled with the first assembly housing.

In one or more of the above embodiments, wherein the connector may comprise a hardline cable connector.

In one or more of the above embodiments, the connector may further comprise a third assembly that may include a back nut having a forward end configured to be threadedly coupled with a rearward end of the second assembly housing and configured to receive the hardline coaxial cable; the gripping portion may include a first end configured to extend through a nonconductive insulator and to extend from a forward end of the first assembly housing and a gripping end configured to receive a center conductor of a hardline coaxial cable; the insulator may include radially spaced apart inner and outer cylindrical walls connected to one another at a forward end by a radial wall and radially extending ribs between the inner and outer cylindrical walls configured to provide radial strength to the insulator; the insulator may extend from a rearward facing surface of an end wall at the forward end of the first assembly housing to a forward facing surface at a forward end of the gripping end of the gripping portion; the second assembly may include a split tube clamp radially surrounding a portion of a conductive metal mandrel and a tubular ramp radially surrounding at least a portion of the clamp; the third assembly may include a seal driver and an O-ring; the back nut may have a forward end configured to be threadedly coupled with a rearward end of the second assembly housing and configured to receive the hardline coaxial cable; the ramp may be configured to be moved forward relative to the clamp when the back nut is threadedly coupled with the second assembly housing such that the ramp and the clamp are configured to engage one another, thereby causing the clamp to radially compress an outer conductor of the hardline coaxial cable onto the tubular conductive metal mandrel; and the seal driver may be configured to be urged in a rearward direction relative to the back nut when the back nut is threadedly coupled with the second assembly housing so as to compress the first O-ring to provide a seal between the back nut and the hardline coaxial cable.

In one or more of the above embodiments, the hardline connector may be configured to improve return loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve a return loss of −30 dB to −35 dB or better over a frequency range of 3 MHz to 5 GHz and a return loss of −20 dB or better over a frequency range of 5 MHz to 6 GHz.

In one or more of the above embodiments, the hardline connector may be configured to improve insertion loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve an insertion loss of −0.15 dB or better over a frequency range of 3 MHz to 5 GHz and an insertion loss of −0.2 dB or better over a frequency range of 5 MHz to 6 GHz.

In one or more of the above embodiments, the longitudinally extending seizure member engaging portion is disposed in an inner wall of the first assembly housing.

In accordance with another embodiment of the present disclosure, a connector seizure member for providing a connector with enhanced mechanical performance during assembly and/or operation may include a seizure member having a forward facing surface that may include a forward extending housing engaging portion that is configured to be received in an seizure member engaging portion in an inner wall of a first connector assembly portion before a second housing portion is threadedly coupled with the first connector assembly portion so as to prevent the seizure member from becoming marred or deformed by being rotated relative to the first connector assembly portion when the second housing portion is threadedly coupled with the first connector assembly portion and enhance mechanical performance of the connector during assembly and/or operation of the hardline connector.

In one or more of the above embodiments, the housing engaging portion may comprise a fin portion, and the seizure member engaging portion may comprise a longitudinal groove portion.

In one or more of the above embodiments, the housing engaging portion may comprise two diametrically arranged fin portions, and the seizure member engaging portion may comprise two longitudinal groove portions configured to receive the two fin portions.

In one or more of the above embodiments, the forward facing surface of the seizure member may include an additional housing engaging portion extending in the forward direction and being configured to be received in the seizure member engaging portion in the inner wall of the first connector assembly portion after the second housing portion is threadedly coupled with the first connector assembly portion such that the seizure bushing is prevented from rotating relative to the first connector assembly portion during operation and/or assembly of the hardline connector.

In one or more of the above embodiments, the seizure member may comprise a seizure bushing.

In one or more of the above embodiments, the first connector assembly portion may include a first housing configured to house a gripping portion therein.

In one or more of the above embodiments, the first connector assembly portion may comprise a front body assembly, the gripping portion may comprise a collet portion, and the second housing portion may comprise a mid-body housing.

In one or more of the above embodiments, the nonconductive seizure member may be configured to compress a gripping end of the gripping portion when the second housing portion is threadedly coupled with the first connector assembly portion.

the connector seizure member may be configured to be rotatingly fixed with the first connector assembly portion before the connector seizure member radially compresses the gripping end of the gripping portion onto a center conductor received in the gripping end.

In one or more of the above embodiments, a third assembly may include a back nut having a forward end configured to be threadedly coupled with a rearward end of the second housing portion and configured to receive the hardline coaxial cable; the first connector assembly portion may include a first housing, a gripping portion, and a nonconductive insulator configured to electrically insulate the gripping portion from the first connector assembly portion; the gripping portion may include a first end configured to extend through the nonconductive insulator and to extend from a forward end of the first connector assembly portion and a gripping end configured to receive a center conductor of a hardline coaxial cable; the insulator may include radially spaced apart inner and outer cylindrical walls connected to one another at a forward end by a radial wall and radially extending ribs between the inner and outer cylindrical walls configured to provide radial strength to the insulator; the insulator may extend from a rearward facing surface of an end wall at the forward end of the first housing to a forward facing surface at a forward end of the gripping end of the gripping portion; a second assembly may include the second housing portion, a split tube clamp radially surrounding a portion of a conductive metal mandrel, and a tubular ramp radially surrounding at least a portion of the clamp; the third assembly may include a seal driver and an O-ring; the back nut has a forward end configured to be threadedly coupled with a rearward end of the second housing portion and configured to receive the hardline coaxial cable; the ramp may be configured to be moved forward relative to the clamp when the back nut is threadedly coupled with the second housing portion such that the ramp and the clamp are configured to engage one another, thereby causing the clamp to radially compress an outer conductor of the hardline coaxial cable onto the tubular conductive metal mandrel; and the seal driver is configured to be urged in a rearward direction relative to the back nut when the back nut is threadedly coupled with the second housing portion so as to compress the first O-ring to provide a seal between the back nut and the hardline coaxial cable.

In one or more of the above embodiments, the hardline connector may be configured to improve return loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve a return loss of −30 dB to −35 dB or better over a frequency range of 3 MHz to 5 GHz and a return loss of −20 dB or better over a frequency range of 5 MHz to 6 GHz.

In one or more of the above embodiments, the hardline connector may be configured to improve insertion loss performance over a wider frequency bandwidth without degrading electrical, mechanical, and environmental performance of the connector by minimizing peaks and valleys of impedance levels within the connector relative to a predetermined 75 ohm impedance level such that the hardline connector is configured to achieve an insertion loss of −0.15 dB or better over a frequency range of 3 MHz to 5 GHz and an insertion loss of −0.2 dB or better over a frequency range of 5 MHz to 6 GHz.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Figure 1:
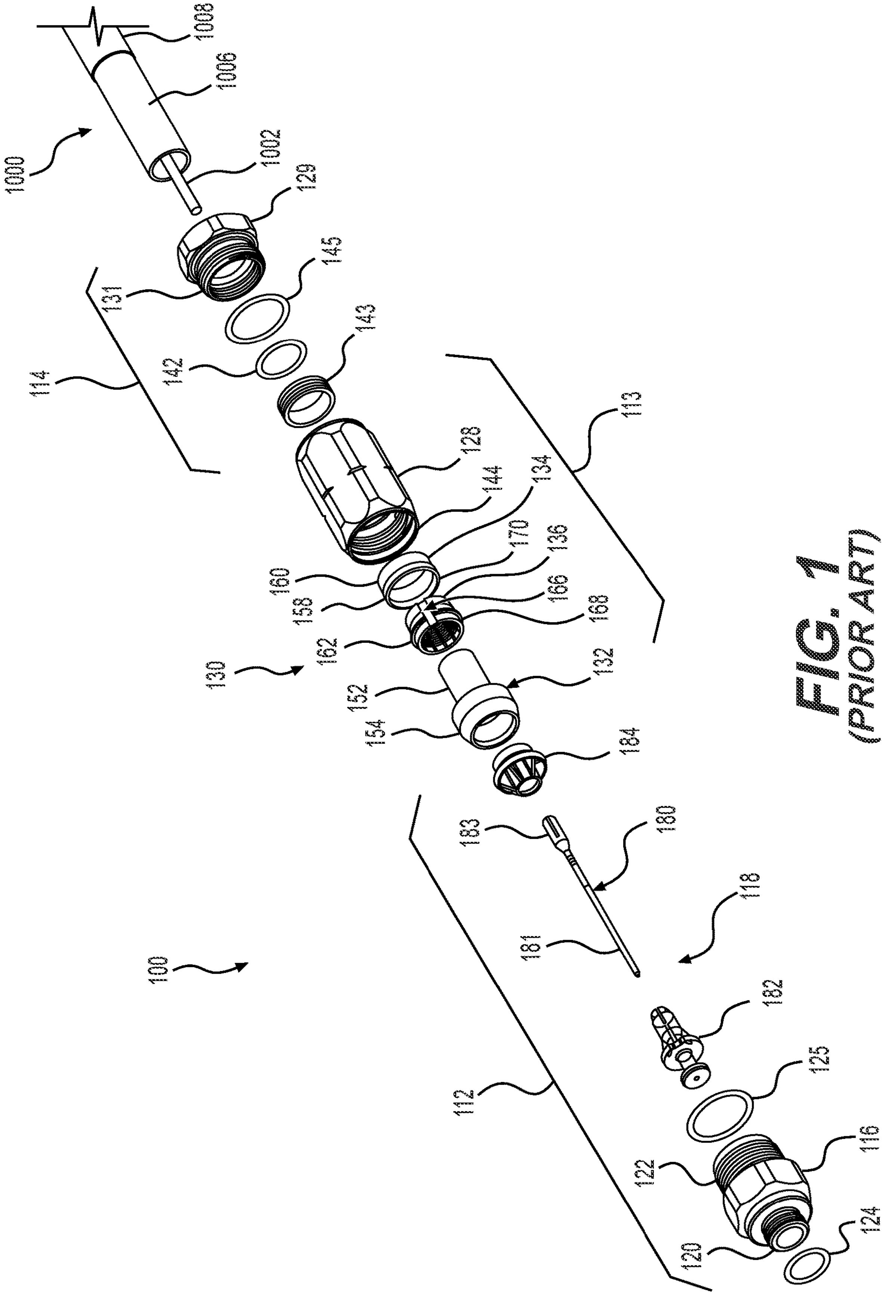
FIG. 1 (PRIOR ART)
FIG. 1 is an exploded perspective view of a conventional hardline connector and hardline cable.
Figure 2:
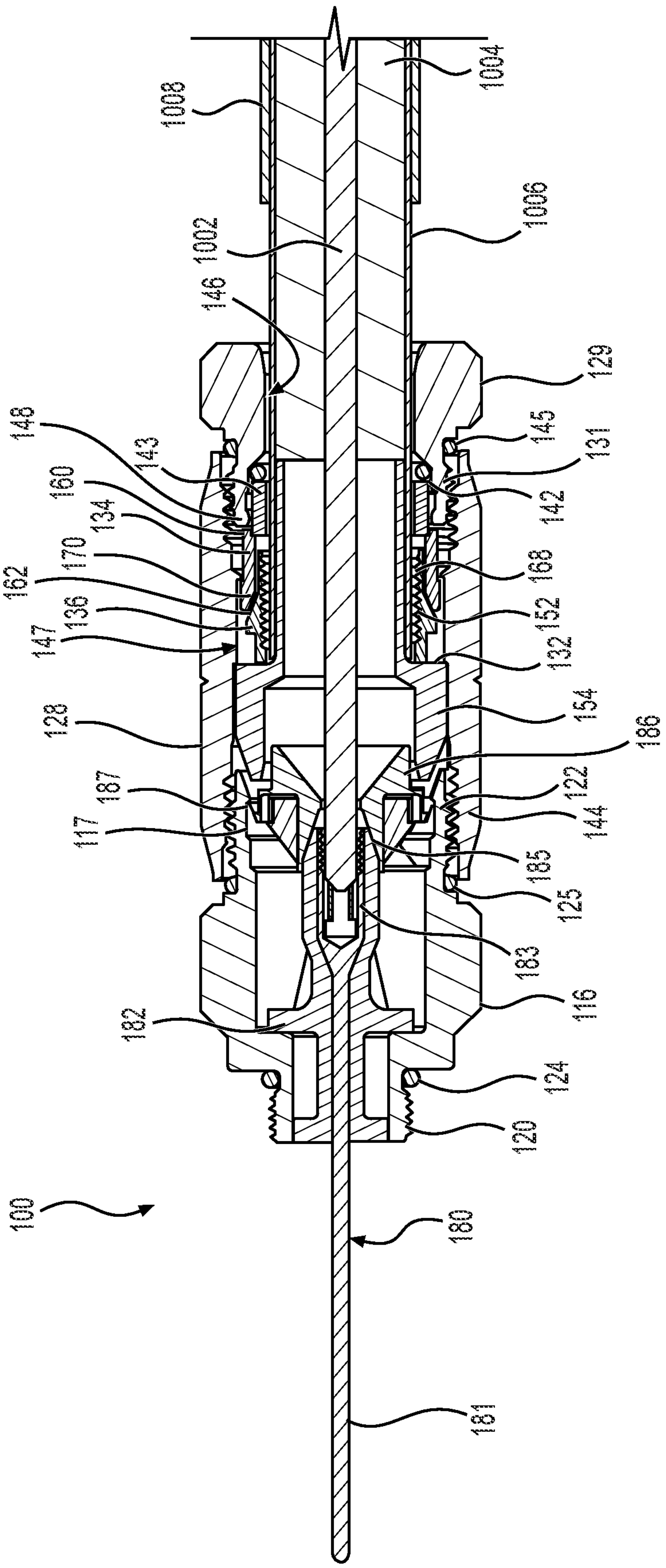
FIG. 2 (PRIOR ART)
FIG. 2 is a side cross-sectional view of the connector of FIG. 1.
Figure 3:
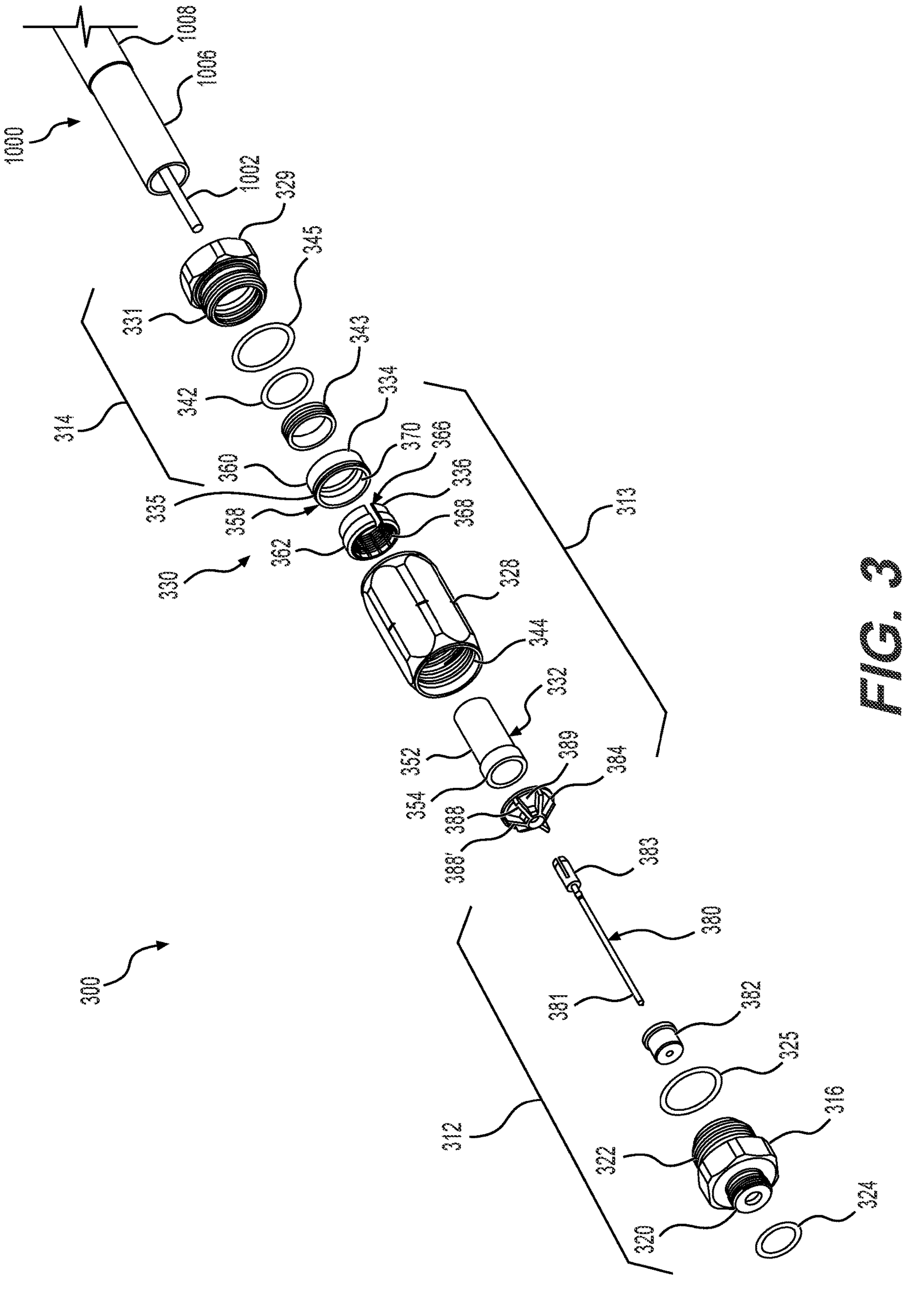
FIG. 3 is an exploded perspective view of an exemplary hardline connector and a hardline cable in accordance with various aspects of the disclosure.
Figure 4:
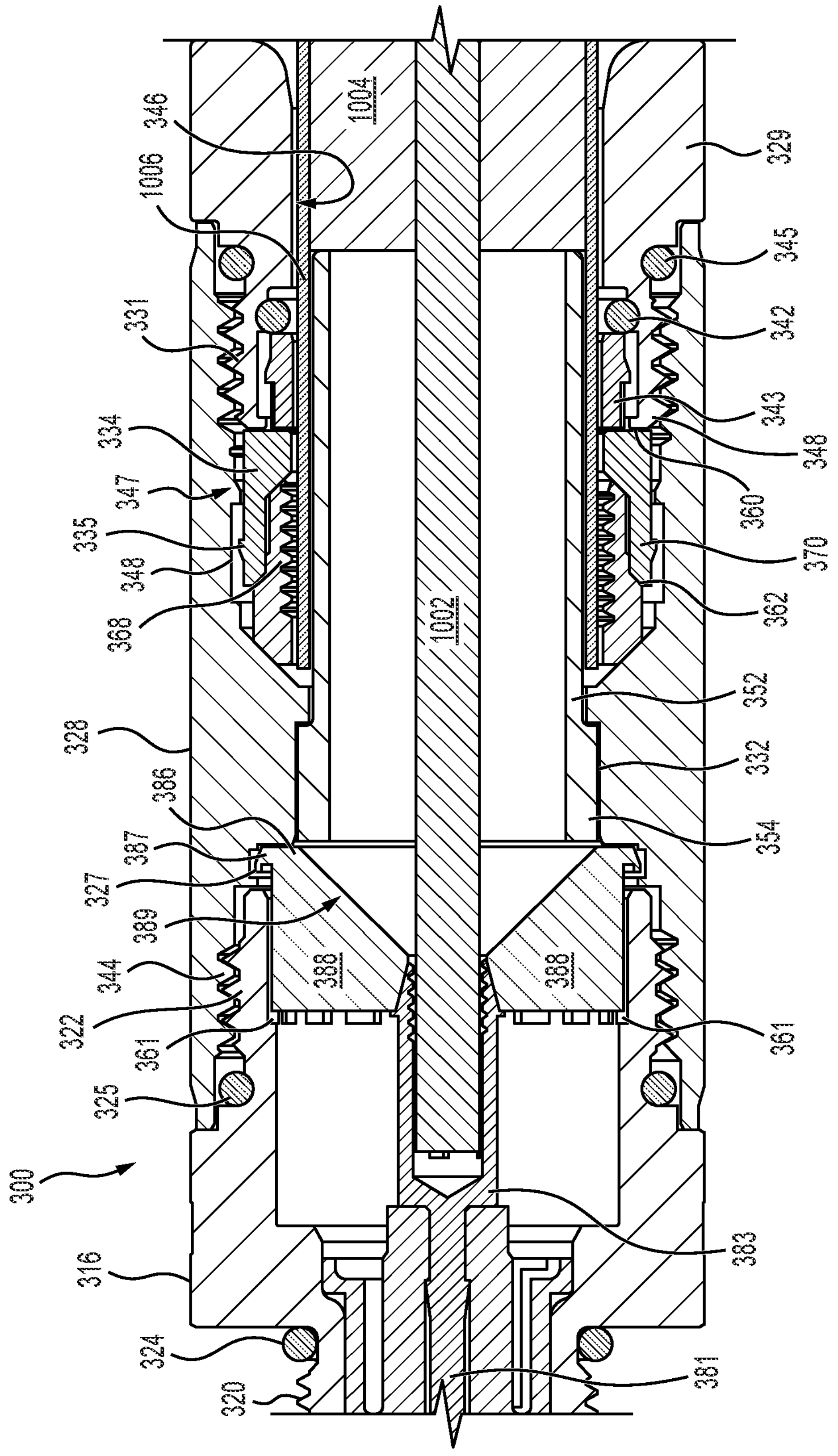
FIG. 4 is a side cross-sectional view of the connector and cable of FIG. 3 in an assembled configuration.
Figure 5:
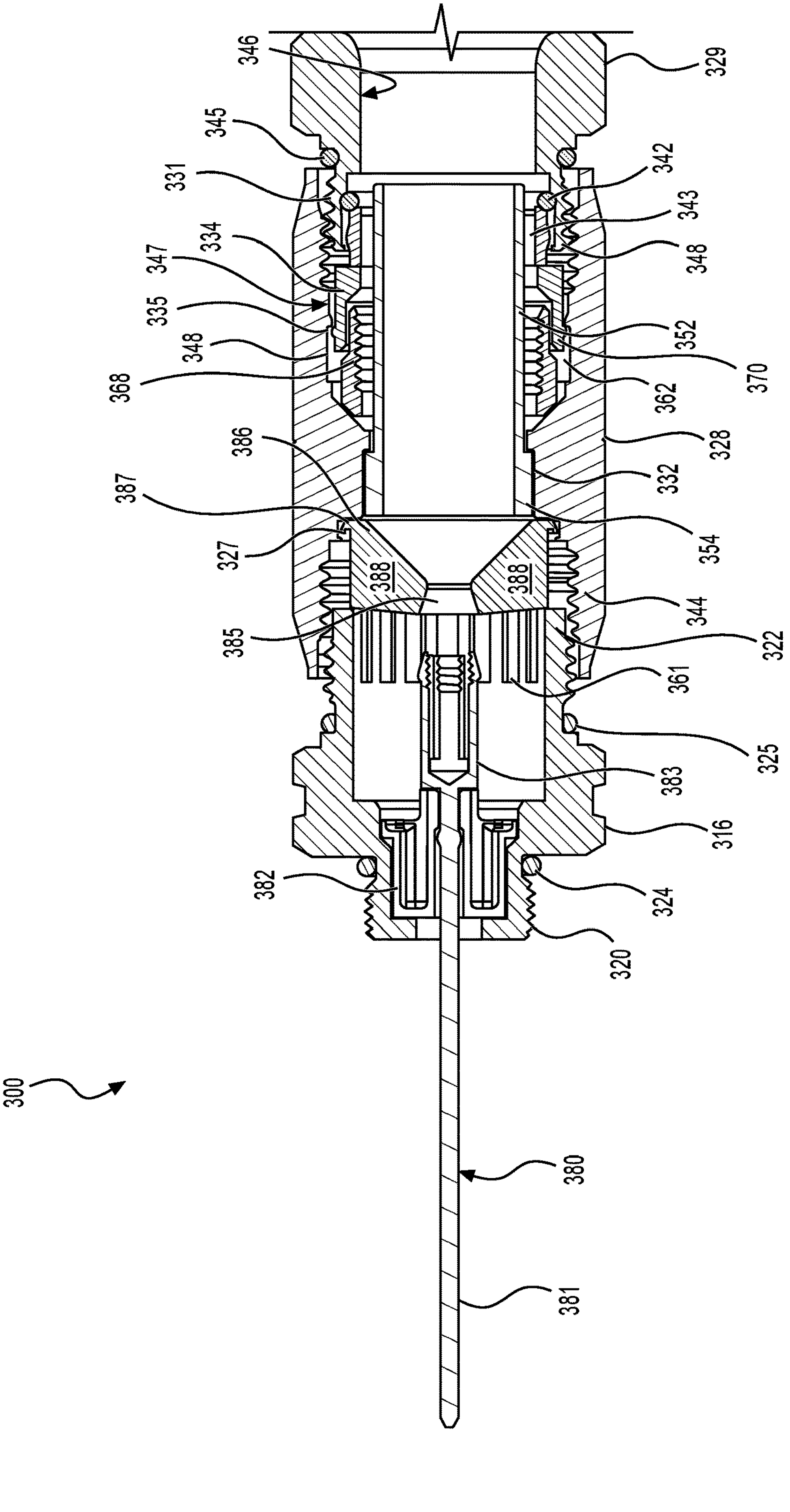
FIG. 5 is a side cross-sectional view of the connector of FIG. 3 in a first configuration before a mid-body housing is coupled with a front body housing.

Referring first to FIGS. 1 and 2, a conventional connector 100 is depicted. The connector 100 is configured to terminate hardline or semi-rigid coaxial cables. The connector 100 includes a first assembly or front body assembly 112, a second assembly or mid-body assembly 113, and a third assembly or back nut assembly 114 that are configured to be removably connected to one another. The connector 100 is configured such that a prepared end of a coaxial cable 1000 can be inserted into the rearward end of the back nut assembly 114 of the connector 100.

The coaxial cable 1000 generally includes a solid center conductor 1002 typically formed from a conductive metal, such as copper, copper clad aluminum, copper clad steel, or the like capable of conducting electrical signals therethrough. Surrounding the cable center conductor 1002 is a cable dielectric 1004, which insulates the cable center conductor to minimize signal loss. The cable dielectric 1004 also maintains a spacing between the cable center conductor 1002 and a cable outer conductor or shield 1006. The cable dielectric 1004 is often a plastic material, such as a polyethylene, a fluorinated plastic material, such as a polyethylene or a polytetrafluoroethylene, a fiberglass braid, or the like. The cable shield or outer conductor 1006 is typically made of metal, such as aluminum or copper, and is often extruded to form a hollow tubular structure with a solid wall having a smooth exterior surface. An insulative cable jacket 1008 surrounds the cable outer conductor 1006 to further seal the coaxial cable 1000. The cable jacket 1008 is typically made of plastic, such as polyvinylchloride, polyethylene, polyurethane, or polytetrafluoroethylene. When the cable is prepared for termination, a length of the dielectric 1004 is removed from the forward end of the cable 1000, leaving a radial space between the center conductor 1002 and the outer conductor 1006.

The connector 100 includes a plurality of components generally having a coaxial configuration about an axis defined by the center conductor 1012 of the coaxial cable 1000. The front body assembly 112 includes a first housing or front body housing 116 and a terminal pin assembly 118 supported by the front body housing 116. The front body housing 116 is formed with an axial bore configured to cooperatively contain the terminal pin assembly 118 and is made from an electrically conductive material such as aluminum, brass or the like. The front body housing 116 is formed with a threaded portion 120 at its forward end and a rearward threaded portion 122 at its rearward end opposite the forward threaded portion.

The terminal pin assembly 118 includes a gripping portion 180, for example, a conductive collet portion, an insulator 182, for example, a collet portion insulator, and a seizure member 184, for example, a seizure bushing. The collet portion 180 includes a pin end 181 and an opposite gripping end 183. The gripping end 183 includes a plurality of fingers configured to receive the center conductor 1002 of the cable 1000. The collet portion insulator 182 surrounds a portion of the collet portion 180, including the gripping end 183, and provides insulation between the conductive collet portion 180 and the conductive front body housing 116. As shown, the collet portion insulator 182 extends from a forward end of the front body housing 116 to the rearward end of the collet portion 180. The pin end 182 extends out of the front body housing 116 from the forward end and is configured to be received by an interface port (not shown), as would be understood by persons skilled in the art. The collet portion insulator 182 is also configured to assist with alignment of the collet portion 180 with the center conductor 1002 of the cable 1000 being terminated with the connector 100.

The forward threaded portion 120 of the front body housing 116 is configured to cooperate with devices located in the field that receive the pin end 181 of the collet portion 180. An O-ring 124 is provided around the forward threaded portion 120 to improve the seal that is made with the device receiving the pin end 181 of the collet portion 180, and a portion of the exterior perimeter of the front body housing 116 may be provided with a hexagonal shape to accommodate the use of tools during installation.

The seizure bushing 184 includes a forward end 185 and an opposite rearward end 186. The forward end 185 includes an opening that tapers from the forward end 185 toward the rearward end 186 and is configured to receive a rearward end of the collet portion insulator 182 that tapers opposite to the forward end 185. The opposite tapers of the forward end 185 of the seizure bushing 184 and the rearward end of the collet portion insulator 182, which surrounds the gripping end 183 of the collet portion 180, are configured to cause the gripping end 183 of the collet portion 180 to be radially compressed onto the center conductor 1002 as the seizure bushing 184 is moved forwardly relative to the collet portion insulator 182 and the collet portion 180. The rearward end 186 includes an opening that tapers from the rearward end 186 toward the forward end 185 to assist with guiding the center conductor into the gripping end 183 of the collet portion 180. The seizure bushing 184 also includes an annular flap 187 configured to be received in an annular groove 117 of the front body housing 116. The seizure bushing 184 may be made of a nonconductive material, for example, plastic, that is strong enough to radially compress the gripping end 183 of the collet portion 180 on the center conductor 1002.

The rearward threaded portion 122 of the front body assembly 112 is configured to be threadedly coupled with the mid-body assembly 113. The rearward threaded portion 122 includes an inward rim face 126 configured to engage an outer face of a mandrel 132 of the mid-body assembly 113.

The mid-body assembly 113 of the connector 100 includes a second housing or mid-body housing 128 having an axial bore and a compression subassembly 130 rotatably supported within the axial bore. The compression subassembly 130 generally includes the mandrel 132, a ramp 134, and a clamp 136. An O-ring 125 is provided around the rearward threaded portion 122 to improve the seal between the front body housing 116 and the mid-body housing 128.

The back nut assembly 114 of the connector 100 includes a back nut (or end cap) 129, seal driver 143, a first O-ring 142, and a second O-ring 145 arranged in a coaxial relationship about the central axis of the mid-body housing 128. The first O-ring 142 improves the seal between the back nut 129 and the cable 1000 upon assembly, and the second O-ring 145 improves the seal between the back nut 129 and the mid-body housing 128.

The mid-body housing 128 is made from an electrically conductive material, such as aluminum, brass, or the like, and includes an internally threaded portion 144 at its forward end, which cooperates with the rearward threaded portion 122 of the entry body housing 116 so that the two connector portions may be threadedly coupled together. Similarly, the back nut 129 may be made from an electrically conductive material, such as aluminum, brass, or the like, and includes an externally threaded portion 131 at its forward end, which cooperates with a rearward threaded portion 133 of the mid-body housing 128 so that the two connector portions may be threadedly coupled together. The exterior surface of the mid-body housing 128 and/or the back nut 129 may be provided with a hexagonal shape to accommodate the use of tools to facilitate such threaded coupling.

The back nut 129 and the seal driver 143 are formed with an axial bore 146 dimensioned to receive the outside diameter of the cable 1000 in snug fitting relationship. At a forward end of the mid-body housing 128, opposite the back nut 129, the mid-body housing 128 is formed with a forward axial bore 147 communicating with the rearward axial bore 146 and dimensioned to accommodate the outer diameter of the mandrel 132. The back nut 129 is preferably formed with an annular shoulder 148 that prevents rearward movement of the ramp 134, and thus the clamp 136, as the clamp 136 is radially compressed, as will be discussed in further detail below.

The mandrel 132 includes a tubular body portion 152 terminating at a forward flanged portion 154. The mandrel 132 is made from metal. The outside diameter of the tubular body portion 152 of the mandrel 132 is dimensioned to be fitted within the inner diameter of the outer conductor 1006 of the coaxial cable 1000. Also, the inside diameter of the tubular body portion 152 is dimensioned to provide a passageway to receive the center conductor 102 of the cable 1000 after the cable has been prepared for termination, wherein a length of the dielectric 1004 has been removed from the forward end of the cable 1000. The mandrel 132 has an axial length that extends through the clamp 136 and into the back nut 129.

The ramp 134 is preferably made from an electrically conductive material, such as aluminum or brass, and includes an exterior surface 158 configured to be received within the forward axial bore 147 of the mid-body housing 128. The ramp 134 terminates at a rearward edge 160, which is configured to engage the annular shoulder 148 of the back nut 129 and a forward end of the seal driver 143.

The clamp 136 is generally in the form of a split tube having a gap 166 extending the full length of the clamp. The gap 166 permits the diameter of the clamp 136 to be reduced more easily so that the clamp can be uniformly, radially compressed around the mandrel 132 upon rearward axial movement of the mandrel 132. An inner surface 168 of the clamp may be provided with structure to enhance gripping of the outer surface of the cable. Such structure may include internal threads, teeth or some other form of textured surface.

As mentioned above, the outer surface of the clamp 136 is provided with a circumferential ramped portion 162, which engages a forward end 170 of the ramp 134, opposite the rearward edge 160, upon forward axial movement of the ramp 134 to radially compress the clamp 136. The ramped portion 162 defines a conical segment of the clamp 136 that tapers radially inwardly in the rearward direction. A rearward portion of the clamp 136 is received in an axial bore of the ramp 134.

Operation and installation of the connector 100 will now be described. The front body assembly 112 is threadedly coupled with an interface port (not shown), by way of the threaded portion 120 of the front body housing 116. The end of the coaxial cable 1000 that is to be inserted through the back nut assembly 114 and into the rearward end of the mid-body housing 128 is prepared in a conventional manner. The back nut assembly 114 is slid over the prepared end of the coaxial cable 1000, and the prepared end of the cable 100 is inserted into the mid-body assembly 113 with the center conductor 1002 extending through the seizure bushing 184 and into the gripping end 183 of the collet portion 180 and the outer conductor 1006 between the outer surface of the tubular body portion 152 of the mandrel 132 and the inner surface of the clamp 136.

The mid-body housing 128 is threadedly coupled and rotated with respect to the front body housing 116 such that a forward end of the flange portion 154 of the mandrel 132 bears against a rearward facing shoulder of the seizure bushing 184 and urges the seizure bushing 184 in a forward direction relative to the collet portion insulator 182. The opposite tapering surfaces of the front end of the seizure bushing 184 and the rearward end of the collet portion insulator 182 engage one another, radially compressing the collet portion insulator 182 on the gripping end 183 of the collet portion 182, which in turn radially compresses the gripping end 183 of the collet portion 182 onto the center conductor 1002.

The back nut 129 is threadedly coupled and rotated with respect to the mid-body housing 128. As the back nut 129 moves axially relative to the mid-body housing 128, the seal driver 143 and the annular shoulder 148 of the back nut 129 urge the ramp 134 in a forward axial direction relative to the clamp 136. The forward translation of the ramp 134 causes the forward end 170 of the ramp 134 to engage the outer ramp portion 162 of the clamp 136, resulting in a radial compression of the clamp 136 onto the outer conductor 1006 of the cable 1000. The radial compression of the clamp 136 reduces the overall diameter of the clamp 136 and reduces the gap 166 of the ferrule so that the inner surface 168 of the clamp 136 bites down on the exposed portion of the outer cable conductor 1006 and presses the outer conductor 1006 against the mandrel 132.

Referring now to FIGS. 3-7, an exemplary hardline connector 300 in accordance with various aspects of the disclosure is illustrated. The connector 300 is a three piece (or three body) connector configured to terminate hardline or semi-rigid coaxial cables. The connector 300 includes a front body assembly 312, a mid-body assembly 313, and a back nut assembly 314 that are configured to be removably connected to one another. The connector 300 is configured such that the prepared end of the coaxial cable 1000 can be inserted into the rearward end of the back nut assembly 314, through the back nut assembly 314, and into the mid-body assembly 313.

The connector 300 includes a plurality of components generally having a coaxial configuration about an axis defined by the center conductor 1012 of the coaxial cable 1000. The front body assembly 312 includes a front body housing 316 and a terminal pin assembly 318 supported by the front body housing 316. The front body housing 316 is formed with an axial bore configured to cooperatively contain the terminal pin assembly 318 and is made from an electrically conductive material such as aluminum, brass or the like. The front body housing 316 is formed with a threaded portion 320 at its forward end and a rearward threaded portion 322 at its rearward end opposite the forward threaded portion.

The terminal pin assembly 318 includes a conductive collet portion 380 extending through a collet portion insulator 382. The collet portion 380 includes a pin end 381 and an opposite gripping end 383. The gripping end 383 includes a plurality of fingers configured to receive the center conductor 1002 of the cable 1000. The collet portion insulator 382 surrounds a portion of the collet portion 380, excluding the gripping end 383, and provides insulation between the conductive collet portion 380 and the conductive front body housing 316. As illustrated, the collet portion insulator 382 maybe formed as inner and outer cylindrical walls connected to one another at a forward end by a radial wall and may include radially extending ribs between the inner and outer cylindrical walls that provide radial strength to the collet portion insulator 382. As shown, the collet portion insulator 382 extends from a rearward facing surface of an end wall at the forward end of the front body housing 316 to a forward facing surface at a forward end of the gripping end 383 of the collet portion 380. The pin end 381 extends out of the front body housing 316 from the forward end and is configured to be received by an interface port (not shown), as would be understood by persons skilled in the art. The collet portion insulator 382 is also configured to assist with alignment of the collet portion 380 with the center conductor 1002 of the cable 1000 being terminated with the connector 300.

The forward threaded portion 320 of the front body housing 316 is configured to cooperate with devices located in the field that receive the pin end 381 of the collet portion 380. An O-ring 324 is provided around the forward threaded portion 320 to improve the seal that is made with the device receiving the pin end 381 of the collet portion 380, and a portion of the exterior perimeter of the front body housing 316 may be provided with a hexagonal shape to accommodate the use of tools during installation. The rearward threaded portion 322 of the front body housing 316 is configured to be threadedly coupled with the mid-body assembly 313.

The mid-body assembly 313 of the connector 300 includes a mid-body housing 328 having an axial bore, a compression subassembly 330 rotatably supported within the axial bore, and a seizure bushing 384. The compression subassembly 330 generally includes the mandrel 332, a ramp 334, and a clamp 336. An O-ring 325 is provided around the rearward threaded portion 322 to improve the seal between the front body housing 316 and the mid-body housing 328.

The mid-body housing 328 is made from an electrically conductive material, such as aluminum, brass, or the like, and includes an internally threaded portion 344 at its forward end, which cooperates with the rearward threaded portion 322 of the front body housing 316 so that the two connector portions may be threadedly coupled together.

The seizure bushing 384 includes a forward end 385 an opposite rearward end 386. The forward end 385 includes an opening that tapers from the forward end 385 toward the rearward end 386 and is configured to receive a rearward end of the gripping end 383 of the collet portion 380, which tapers opposite to the forward end 385. The opposing tapers of the forward end 385 of the seizure bushing 384 and the gripping end 383 of the collet portion 380 are configured to cause the gripping end 383 of the collet portion 380 to be radially compressed onto the center conductor 1002 as the seizure bushing 384 is moved forwardly relative to the collet portion 380, thereby seizing the collet portion 380. The rearward end 386 includes an opening that tapers in a direction from the rearward end 386 toward the forward end 385 to assist with guiding the center conductor into the gripping end 383 of the collet portion 380. The seizure bushing 384 also includes an annular rim 387 configured to be received in an annular groove 327 of the mid-body housing 328 such that the seizure bushing 384 is retained in the mid-body housing 328 prior to the mid-body housing 328 being coupled with the front body housing 316. The seizure bushing 384 is configured to rotate freely relative to the mid-body housing 328, but relative axial movement between the seizure bushing 384 and mid-body housing 328 is limited by the annular groove 327 and annular rim 387.

The seizure bushing 384 includes a forward facing surface 389 that is conically shaped and includes a plurality of housing engaging portions 388, 388', for example, fins, that extend in the forward direction from the forward facing surface 389. The front body housing 316 includes a plurality of seizure bushing engaging portions 361, for example, longitudinal grooves or slots, that are sized and arranged to receive a radially outer portion of the fins 388, 388' when the seizure bushing 384 is disposed in a rearward end of the front body housing 316. The number of grooves 361 should be equal to the number of fins 388, 388' or equal to a multiple of the number of fins 388, 388' such that each fin 388' can occupy a groove 361. For example, the illustrated embodiment includes six fins 388, 388', and thus the front body must have 6, 12, 24, etc. longitudinal grooves 361. When the fins 388' are received in the grooves 361, the seizure bushing 384 is prevented from rotating relative to the front body housing 316, but the mid-body housing 328 continues to be configured to rotate relative to the seizure bushing 384. The seizure bushing 384 is made of a nonconductive material, for example, plastic, that is strong enough to radially compress the collet portion 380 on the center conductor 1002.

Figure 7:
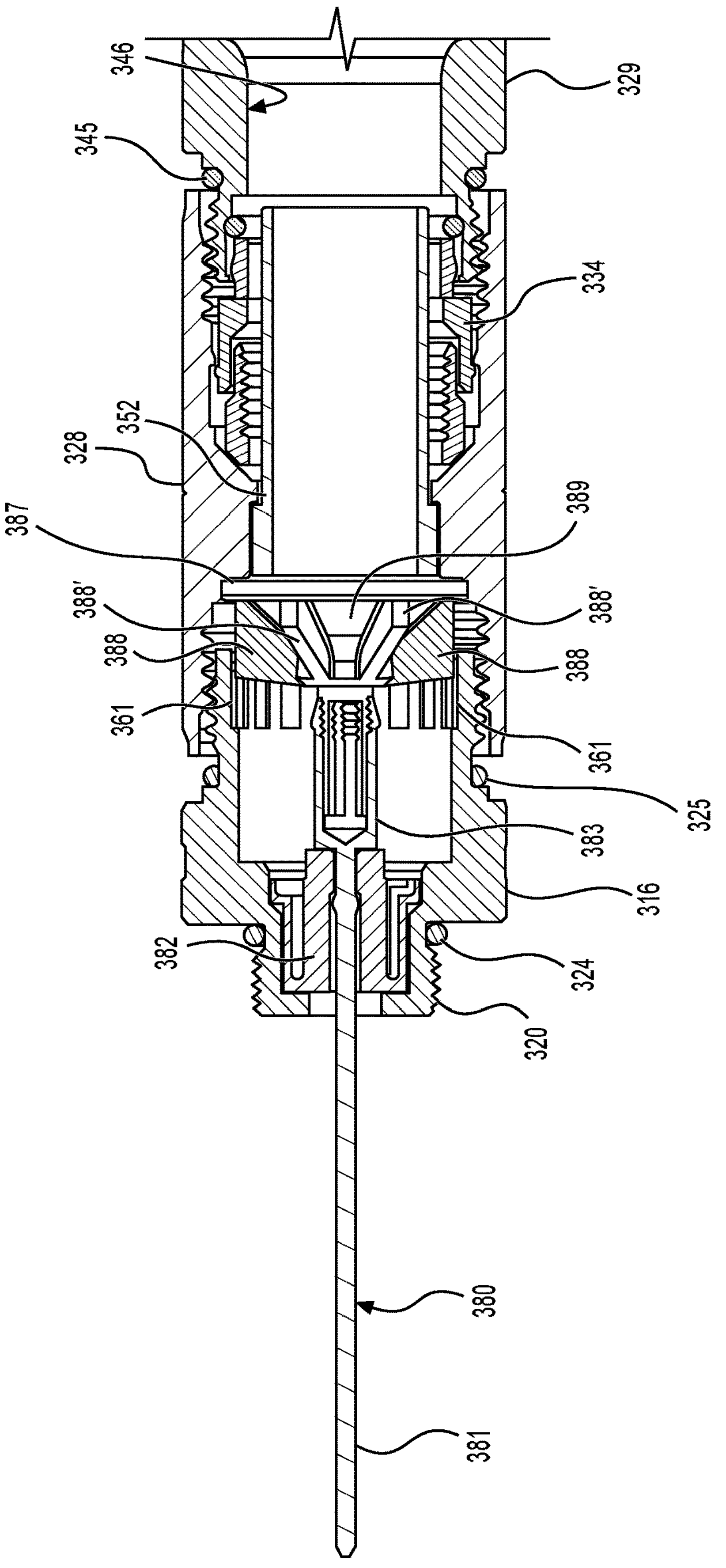
FIG. 7 is a side cross-sectional view of the connector of FIG. 3 in a third configuration where the front body housing before the mid-body housing is partially threadedly coupled with the front body housing.

As best illustrated in FIG. 7, the radially outer portion of two of the fins 388, which are diametrically opposed to one another on the forward facing surface 389, extend further in the forward axial direction from the forward facing surface 389 than the remaining fins 388'. Particularly, as shown, the fins 388' and the fins 388 extend from the forward facing surface 389 in the radial and axial directions. The "longer" fins 388 refer to the fins 388 extending further from the forward facing surface 389 in the axial direction. In other words, a forward edge of the fins 388 may extend in the radial direction at an angle that is perpendicular or substantially perpendicular to the longitudinal axis of the connector 300, while a forward edge of the fins 388' extends at an acute angle relative to the connector that is less than the angle of the forward edge of the fins 388. The two fins 388 are particularly configured to be received in two of the slots 361 before the internally threaded portion 344 of the mid-body housing 328 engages the rearward threaded portion 322 of the front body housing 316.

Figure 6:
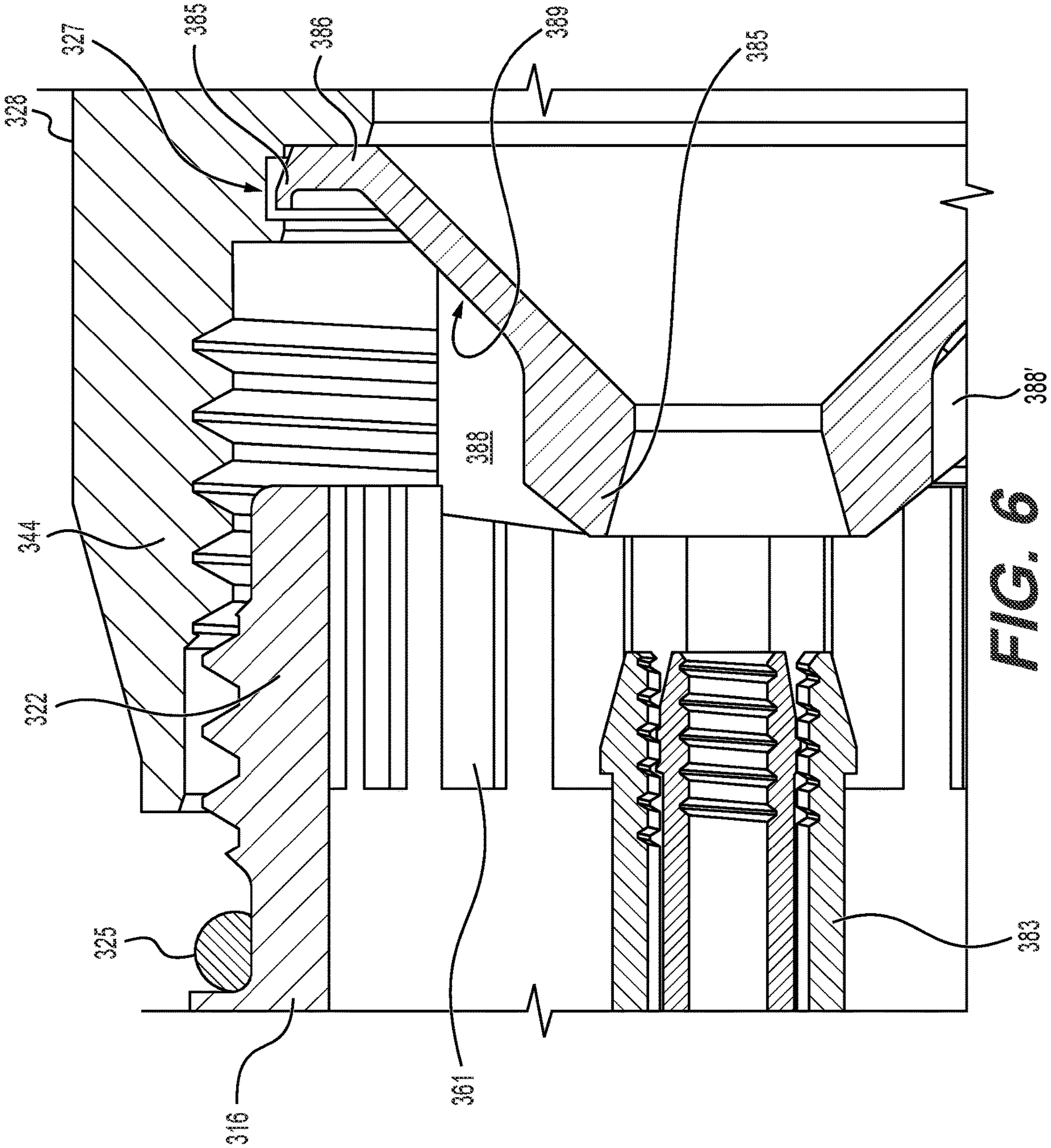
FIG. 6 is an enlarged partial side-cross-sectional view of the connector of FIG. 3 in a second configuration where two fins, projections, or other housing engaging portions of a seizure bushing are received by grooves, channels, or other seizure bushing engaging portions in the front body housing before the mid-body housing is threadedly coupled with the front body housing.

Moreover, as shown in FIGS. 6 and 7, the two fins 388 are configured to be received in two of the slots 361 before the seizure bushing 384 seizes the collet portion 380. Of course, the remaining fins 388' could be configured with the same length as the two longer fins 388; however, the additional plastic material resulting from lengthening the remaining fins may have a negative impact on return loss performance of the connector 300. Thus, in order to minimize the negative impact on return loss performance of the connector 300, it may be desirable to provide only two of the longer fins 388.

The back nut assembly 314 of the connector 300 includes a back nut (or end cap) 329, seal driver 343, a first O-ring 342, and a second O-ring 345 arranged in a coaxial relationship about the central axis of the mid-body housing 328. The first O-ring 342 is configured to improve the seal between the back nut 329 and the cable 1000 upon assembly, and the second O-ring 345 is configured to improve the seal between the back nut 329 and the mid-body housing 328.

The back nut 329 may be made from an electrically conductive material, such as aluminum, brass, or the like, and includes an externally threaded portion 331 at its forward end, which cooperates with a rearward threaded portion 333 of the mid-body housing 328 so that the two connector portions may be threadedly coupled together. The exterior surface of the mid-body housing 328 and/or the back nut 329 may be provided with a hexagonal shape to accommodate the use of tools to facilitate such threaded coupling.

The back nut 329 and the seal driver 343 are formed with an axial bore 346 dimensioned to receive the outside diameter of the outer conductor 1006 of the cable 1000 (or the outside diameter of the jacket 1008 depending on the type of cable 1000 being used) in snug fitting relationship. At a forward end of the mid-body housing 328, opposite the back nut 329, the mid-body housing 328 is formed with a forward axial bore 347 communicating with the rearward axial bore 346 and dimensioned to accommodate the outer diameter of the mandrel 332. The mid-body housing 328 may have an inner surface that includes an annular groove 348 configured to receive an annular notch 335 extending radially outward from an outer surface of the ramp 334 so as to limit rearward movement of the ramp 334, and thus the clamp 336, relative to the mid-body housing 328.

The mandrel 332 includes a tubular body portion 352 terminating at a forward flanged portion 354. The mandrel 332 is made from metal. The outside diameter of the tubular body portion 352 of the mandrel 332 is dimensioned to be fitted within the inner diameter of the outer conductor 1006 of the coaxial cable 1000. Also, the inside diameter of the tubular body portion 352 is dimensioned to provide a passageway to receive the center conductor 302 of the cable 1000 after the cable has been prepared for termination, wherein a length of the dielectric 1004 has been removed from the forward end of the cable 1000. The mandrel 332 has an axial length that extends through the clamp 336 and into the back nut 329.

The ramp 334 is preferably made from an electrically conductive material, such as aluminum or brass, and includes an exterior surface 358 configured to be received within the forward axial bore 347 of the mid-body housing 328. The ramp 334 terminates at a rearward edge 360, which is configured to engage the annular shoulder 348 of the back nut 329 and a forward end of the seal driver 343.

The clamp 336 is generally in the form of a split tube having a gap 366 extending the full length of the clamp. The gap 366 permits the diameter of the clamp 336 to be reduced more easily so that the clamp can be uniformly, radially compressed around the mandrel 332 upon rearward axial movement of the mandrel 332. An inner surface 368 of the clamp may be provided with structure to enhance gripping of the outer surface of the cable. Such structure may include internal threads, teeth, or some other form of textured surface.

As mentioned above, the outer surface of the clamp 336 is provided with a circumferential ramped portion 362, which engages a forward end 370 of the ramp 334, opposite the rearward edge 360, upon forward axial movement of the ramp 334 to radially compress the clamp 336. The ramped portion 362 defines a conical segment of the clamp 336 that tapers radially inwardly in the rearward direction. A rearward portion of the clamp 336 is received in an axial bore of the ramp 334.

Operation and installation of the connector 300 will now be described. Typically, the front body assembly 312 is threadedly coupled with an interface port (not shown), by way of the threaded portion 320 of the front body housing 316, before the mid-body housing 328 is coupled with the front body housing 316. The end of the coaxial cable 1000 that is to be inserted through the back nut assembly 314 and into the rearward end of the mid-body housing 328 is prepared in a conventional manner. The back nut assembly 314 is slid over the prepared end of the coaxial cable 1000, and the prepared end of the cable 300 is inserted into the mid-body assembly 313 with the center conductor 1002 extending through the seizure bushing 384. The center conductor 1002 is inserted into the gripping end 383 of the collet portion 380, and the outer conductor 1006 is between the outer surface of the tubular body portion 352 of the mandrel 332 and the inner surface of the clamp 336.

The mid-body housing 328 is moved axially relative to the front body housing 316 until the two longer fins 388 are received in two grooves 361 of the front body housing 316, which occurs before the threaded portion 344 of the mid-body housing 328 engages the rearward threaded portion 322 of the front body housing 316, thereby rotatingly fixing the seizure bushing 384 relative to the front body housing 316 before the mid-body housing 328 begins to threadedly couple with the front body housing 316. Meanwhile, the mid-body housing 328 is configured to freely rotate relative to the seizure bushing 384. The seizure bushing 384 helps to align the center conductor of the cable with the collet portion 380.

The mid-body housing 328 is threadedly coupled and rotated with respect to the front body housing 316 such that the seizure bushing 384 is urged in a forward direction relative to the front body housing 316 and the collet portion 380. As the seizure bushing 384 further enters the front body housing 316, the remaining fins 388' are received by other ones of the grooves 361 in the inner wall of the front body housing 316 to further prevent relative rotation between the seizure bushing 384 and the front body housing 316. The opposite tapering surfaces of the front end of the seizure bushing 384 and the gripping end 383 of the collet portion 380 engage one another, thereby radially compressing the gripping end 383 of the collet portion 380 onto the center conductor 1002.

The back nut 329 is threadedly coupled and rotated with respect to the mid-body housing 328. As the back nut 329 moves axially relative to the mid-body housing 328, the seal driver 343 and the annular shoulder 348 of the back nut 329 urge the ramp 334 in a forward axial direction relative to the clamp 336 and the mid-body housing 328. The forward translation of the ramp 334 causes (i) a forward tapered end of the clamp 336 to engage an oppositely tapered inner wall of the mid-body housing 328, (ii) the forward end 370 of the ramp 334 to engage the outer ramp portion 362 of the clamp 336, and/or (iii) a tapered inner surface of the clamp 336 to engage a rearward end of the clamp 336, thereby resulting in radial compression of the clamp 336 onto the outer conductor 1006 of the cable 1000 at multiple regions along a length of the clamp 336. The radial compression of the clamp 336 reduces the overall diameter of the clamp 336 and reduces the gap 366 so that the inner surface 368 of the clamp 336 bites down on the exposed portion of the outer cable conductor 1006 and presses the outer conductor 1006 against the mandrel 332. The axial movement of the back nut 329 relative to the mid-body housing 328 also urges the seal driver 343 in a rearward direction to compress the first O-ring 342 to provide an environmental seal between the back nut 329 and the outer conductor 1006 or the jacket 1008 of the cable 1000.

It should be appreciated that if the seizure bushing 384 is not rotatingly fixed to the front body housing 316 before the seizure bushing 384 seizes the collet portion 380, rotation of the seizure bushing 384 relative the collet portion 380 could cause the collet portion 380 to snap, and thus the RF signal of the connector 300 would be lost. Further, it should be appreciated that if the fins 388, 388' do not engage the grooves 361 of the front body housing 316 before the threaded portion 344 of the mid-body housing 328 engages the rearward threaded portion 322 of the front body housing 316, the fins 388, 388' will deform and inhibit reusability of the connector 300. Thus, in the case of a seizure bushing without the longer fins 388, the shorter fins 388' may experience marring and deformation of the material.

Figure 8:
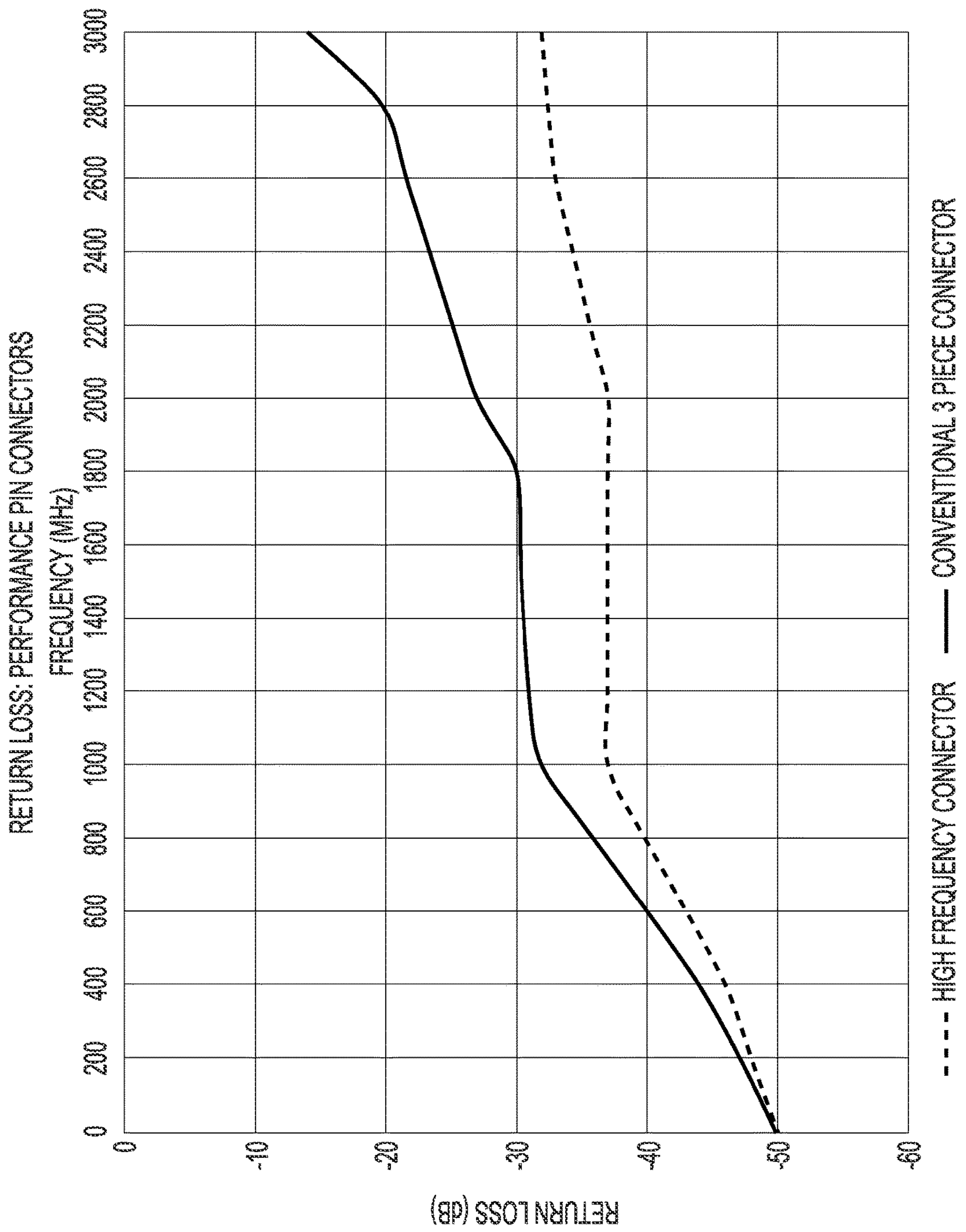
FIG. 8 is a graph illustrating return loss of the exemplary hardline connector of FIG. 3 versus a conventional connector.

As shown in FIG. 8, the high frequency hardline connector 300 according to the disclosure is configured to achieve a return loss of −20 dB or better over a frequency range of 5 MHz to 3 GHz or greater, with such performance results being unexpected to one of ordinary skill in the art. In some aspects, the hardline connector 300 is configured to achieve a return loss of −30 dB to −35 dB over a frequency range of 5 MHz to 3 GHz or greater, with such performance results being unexpected to one of ordinary skill in the art. In some aspects, the hardline connector 300 is configured to achieve a return loss of −20 dB or better over a frequency range of 5 MHz to 6 GHz, with such performance results being unexpected to one of ordinary skill in the art.

Figure 9:
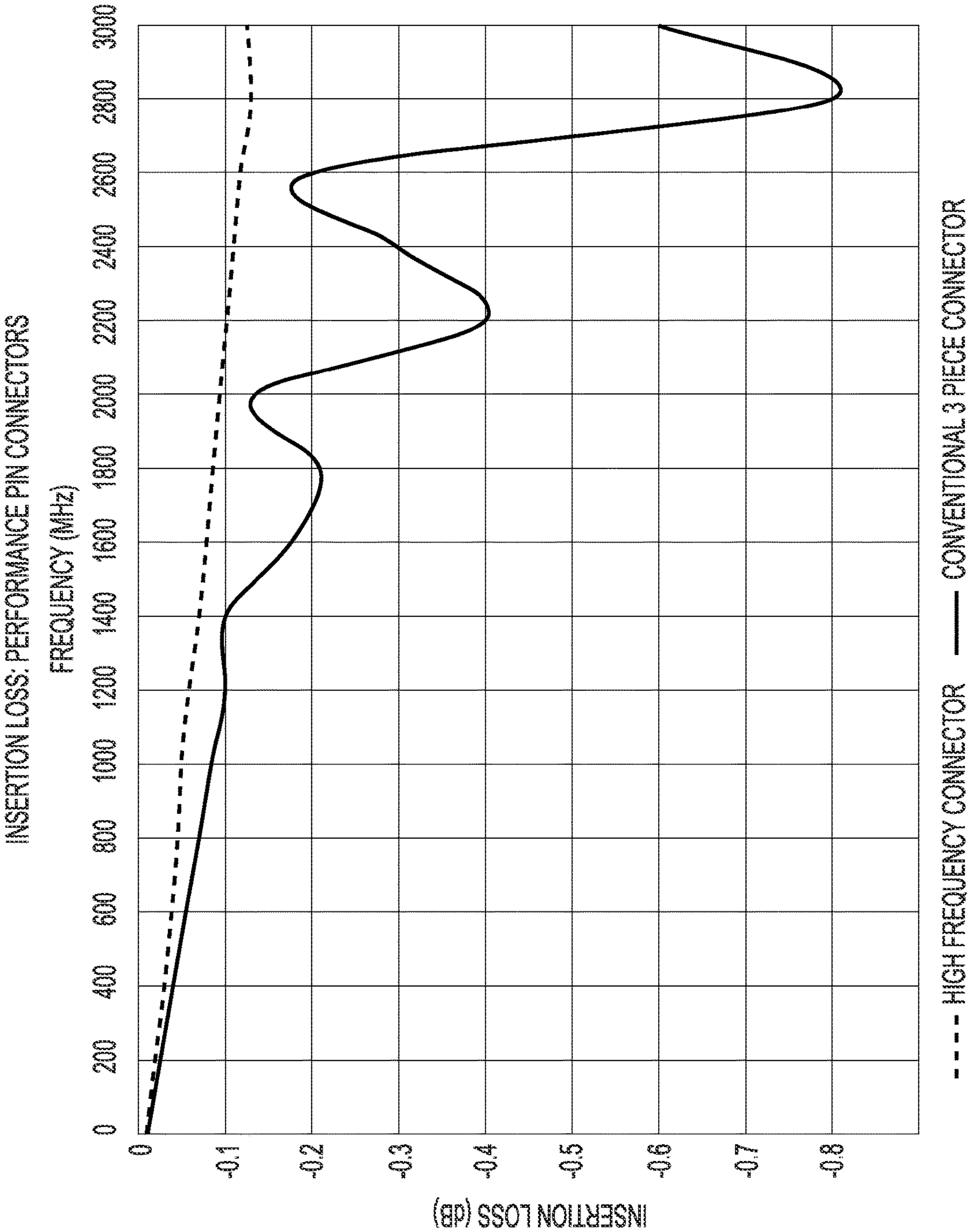
FIG. 9 is a graph illustrating insertion loss of the exemplary hardline connector of FIG. 3 versus a conventional connector.

As shown in FIG. 9, the high frequency hardline connector 300 according to the disclosure is configured to achieve improved insertion loss over a frequency range of 5 MHz to 3 GHz or greater, with such performance results being unexpected to one of ordinary skill in the art. In some aspects, the hardline connector 300 is configured to achieve improved insertion loss over a frequency range of 5 MHz to 6 GHz, with such performance results being unexpected to one of ordinary skill in the art. In some aspects, the hardline connector 300 is configured to achieve an insertion loss of −0.2 dB or better over a frequency range of 5 MHz to 6 GHZ, with such performance results being unexpected to one of ordinary skill in the art. In some aspects, the hardline connector 300 is configured to achieve an insertion loss of −0.15 dB or better over a frequency range of 5 MHz to 3 GHZ, with such performance results being unexpected to one of ordinary skill in the art.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A connector configured to provide enhanced mechanical performance during assembly and/or operation of the hardline connector comprising:

a first assembly configured to be threadedly coupled with an interface port;

a second assembly configured to be threadedly coupled with the first assembly;

wherein the first assembly includes a first assembly housing and a gripping portion housed in at least a portion of the first assembly housing;

wherein the gripping portion includes a first end portion configured to extend from a forward first housing end portion of the first assembly housing and a second end portion configured to receive at least a portion of a center conductor of a hardline coaxial cable;

wherein the second assembly includes a second assembly housing having a second assembly forward end portion configured to be threadedly coupled with a rearward first housing end portion of the first assembly housing and a second assembly rearward end portion configured to receive the hardline coaxial cable;

wherein the second assembly housing is configured to house and retain at least a portion of a nonconductive seizure member;

wherein the nonconductive seizure member is configured to compress the gripping end of the gripping portion when the second assembly housing is threadedly coupled with the first assembly housing;

wherein the seizure member is configured to be rotatingly fixed with the first assembly before the seizure member radially compresses the gripping end of the gripping portion onto a center conductor received in the gripping end; and wherein a forward facing surface of the seizure member includes a housing engaging portion extending in the forward direction and being configured to be received in a longitudinally extending seizure member engaging portion of the first assembly housing before the second assembly housing is threadedly coupled with the first assembly housing such that the seizure member is prevented from rotating relative to the first assembly housing when the second assembly housing is being threadedly coupled with the first assembly housing so as to prevent marring and/or deformation of the housing engaging portion and enhance mechanical performance of the connector during assembly and/or operation of the connector.

2. The connector of claim 1, wherein the housing engaging portion comprises a fin portion, and the seizure member engaging portion comprises a longitudinal groove portion.

3. The connector of claim 1, wherein the housing engaging portion comprises two diametrically arranged fin portions, and the seizure member engaging portion comprises two longitudinal groove portions configured to receive the two fin portions.

4. The connector of claim 1, wherein the forward facing surface of the seizure member includes an additional housing engaging portion extending in the forward direction and being configured to be received in the seizure member engaging portion in the inner wall of the first assembly housing after the second assembly housing is threadedly coupled with the first assembly housing such that the seizure bushing is prevented from rotating relative to the first assembly housing.

5. The connector of claim 1, wherein the seizure member comprises a seizure bushing.

6. The connector of claim 1, wherein the first assembly comprises a front body assembly, the gripping portion comprises a collet portion, and the second assembly comprises a mid-body assembly.

7. The connector of claim 1, wherein the nonconductive seizure member is configured to compress the gripping end of the gripping portion when the second assembly housing is threadedly coupled with the first assembly housing.

8. The connector of claim 1, wherein the connector comprises a hardline cable connector.

9. The connector of claim 1, further comprising:

a third assembly that includes a back nut having a forward end configured to be threadedly coupled with a rearward end of the second assembly housing and configured to receive the hardline coaxial cable;

wherein the gripping portion includes a first end configured to extend through a nonconductive insulator and to extend from a forward end of the first assembly housing and a gripping end configured to receive a center conductor of a hardline coaxial cable;

wherein the insulator includes radially spaced apart inner and outer cylindrical walls connected to one another at a forward end by a radial wall;

wherein the insulator extends from a rearward facing surface of an end wall at the forward end of the first assembly housing to a forward facing surface at a forward end of the gripping end of the gripping portion;

wherein the second assembly includes a split tube clamp radially surrounding a portion of a conductive metal mandrel and a tubular ramp radially surrounding at least a portion of the clamp;

wherein the third assembly includes a seal driver and an O-ring;

wherein the back nut has a forward end configured to be threadedly coupled with a rearward end of the second assembly housing and configured to receive the hardline coaxial cable;

wherein the ramp is configured to be moved forward relative to the clamp when the back nut is threadedly coupled with the second assembly housing such that such that the ramp and the clamp are configured to engage one another, thereby causing the clamp to radially compress an outer conductor of the hardline coaxial cable onto the tubular conductive metal mandrel; and wherein the seal driver is configured to be urged in a rearward direction relative to the back nut when the back nut is threadedly coupled with the second assembly housing so as to compress the first O-ring to provide a seal between the back nut and the hardline coaxial cable.

10. The connector of claim 1, wherein the hardline connector is configured to achieve a return loss of −30 dB to −35 dB or better over a frequency range of 3 MHz to 5 GHz and a return loss of −20 dB or better over a frequency range of 5 MHz to 6 GHz by preventing the seizure member from rotating relative to the first assembly housing when the second assembly housing is being threadedly coupled with the first assembly housing thereby preventing marring and/or deformation of the housing engaging portion so as to minimize peaks and valleys of impedance levels within the connector relative to a predetermined 75 ohm impedance level.

11. The connector of claim 1, wherein the hardline connector is configured to achieve an insertion loss of −0.15 dB or better over a frequency range of 3 MHz to 5 GHz and an insertion loss of −0.2 dB or better over a frequency range of 5 MHz to 6 GHz by preventing the seizure member from rotating relative to the first assembly housing when the second assembly housing is being threadedly coupled with the first assembly housing, thereby preventing marring and/or deformation of the housing engaging portion so as to minimize peaks and valleys of impedance levels within the connector relative to a predetermined 75 ohm impedance level.

12. The connector of claim 1, wherein the longitudinally extending seizure member engaging portion is disposed in an inner wall of the first assembly housing.

13. A device for providing enhanced performance during assembly and/or operation of a hardline connector comprising:

an enhanced performance hardline connector assembly comprising:

a first portion structured and arranged to be threadedly coupled with an interface port;

a second portion structured and arranged to be threadedly coupled with the first assembly;

wherein the first portion includes a first housing portion and a gripping portion housed in at least a portion of the first housing portion;

wherein the gripping portion includes a first end portion structured to extend from a forward first housing end portion of the first housing portion and a second end portion structured and arranged to receive at least a portion of a center conductor of a hardline coaxial cable;

wherein the second portion includes a second housing portion having a forward end portion structured and arranged to be threadedly coupled with a rearward first housing end portion of the first housing portion and a rearward end portion configured to receive the hardline coaxial cable;

wherein the second housing portion is structured and arranged to house and retain at least a portion of a nonconductive seizure portion before the second portion is coupled with the first portion;

wherein the nonconductive seizure portion is structured and arranged to compress the gripping end of the gripping portion when the second housing portion is threadedly coupled with the first housing portion;

wherein the nonconductive seizure portion is structured and arranged to be rotatingly fixed with the first portion before the nonconductive seizure portion radially compresses the gripping end of the gripping portion onto a center conductor received in the gripping end;

wherein the nonconductive seizure portion includes a housing engaging portion that extends in a forward direction and is structured and arranged to be received in a longitudinally extending seizure portion engaging portion of the first housing portion before the second housing portion is threadedly coupled with the first housing portion; and wherein the enhanced performance hardline connector assembly is structured and arranged to enhance performance of a hardline cable connection by preventing the nonconductive seizure portion from rotating relative to the first housing portion when the second housing portion is threadedly coupled with the first housing portion so as to prevent marring and/or deformation of the housing engaging portion.

14. The device of claim 13, wherein the housing engaging portion comprises a fin portion, and the seizure portion engaging portion comprises a longitudinal groove portion.

15. The device of claim 13, wherein the housing engaging portion comprises two diametrically arranged fin portions, and the seizure portion engaging portion comprises two longitudinal groove portions configured to receive the two fin portions.

16. The device of claim 13, wherein the forward facing surface of the seizure portion includes an additional housing engaging portion that extends in the forward direction and is structured and arranged to be received in the seizure portion engaging portion in the inner wall of the first housing portion after the second housing portion is threadedly coupled with the first housing portion such that the seizure bushing is prevented from rotating relative to the first housing portion.

17. The device of claim 13, wherein the seizure portion comprises a seizure bushing.

18. The device of claim 13, wherein the first portion comprises a front body assembly, the gripping portion comprises a collet portion, and the second portion comprises a mid-body assembly.

19. The device of claim 13, wherein the nonconductive seizure portion is structured and arranged to compress the gripping end of the gripping portion when the second housing portion is threadedly coupled with the first housing portion.

20. The device of claim 13, further comprising:

- a third portion that includes a back nut structured and arranged to be threadedly coupled with a rearward end of the second housing portion and to receive the hardline coaxial cable;
- wherein the gripping portion includes a first end configured to extend through a nonconductive insulator and to extend from a forward end of the first housing portion and a gripping end configured to receive a center conductor of a hardline coaxial cable;
- wherein the insulator includes radially spaced apart inner and outer cylindrical walls connected to one another at a forward end by a radial wall;
- wherein the insulator extends from a rearward facing surface of an end wall at the forward end of the first housing portion to a forward facing surface at a forward end of the gripping end of the gripping portion;
- wherein the second portion includes a split tube clamp radially surrounding a portion of a conductive metal mandrel and a tubular ramp radially surrounding at least a portion of the clamp;
- wherein the third portion includes a seal driver and an O-ring;
- wherein the ramp is configured to be moved forward relative to the clamp when the back nut is threadedly coupled with the second housing portion such that the ramp and the clamp are configured to engage one another, thereby causing the clamp to radially compress an outer conductor of the hardline coaxial cable onto the tubular conductive metal mandrel; and
- wherein the seal driver is configured to be urged in a rearward direction relative to the back nut when the back nut is threadedly coupled with the second housing portion so as to compress the first O-ring to provide a seal between the back nut and the hardline coaxial cable.

21. The device of claim 13, wherein the enhanced performance hardline connector assembly is structured and arranged to achieve a return loss of −30 dB to −35 dB or better over a frequency range of 3 MHz to 5 GHz and a return loss of −20 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

22. The device of claim 13, wherein the enhanced performance hardline connector assembly is structured and arranged to achieve an insertion loss of −0.15 dB or better over a frequency range of 3 MHz to 5 GHz and an insertion loss of −0.2 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

23. The device of claim 13, wherein the longitudinally extending seizure portion engaging portion is disposed in an inner wall of the first housing portion.

24. A device for providing enhanced performance during assembly and/or operation of a hardline connector comprising:

- an enhanced performance hardline connector assembly comprising:
  - a first portion structured and arranged to be coupled with an interface port;
  - a second portion structured and arranged to be coupled with the first assembly;
- wherein the first portion includes a first housing portion and a gripping portion that is structured and arranged to receive at least a portion of a center conductor of a hardline coaxial cable;
- wherein the second portion includes a second housing portion structured and arranged to be threadedly coupled with the first housing portion;
- wherein the second housing portion is structured and arranged to house and retain at least a portion of a nonconductive seizure portion before the second portion is coupled with the first portion and to urge the nonconductive seizure portion to compress the gripping portion when the second housing portion is threadedly coupled with the first housing portion;
- wherein the nonconductive seizure portion is structured and arranged to be rotatingly fixed with the first portion before the nonconductive seizure portion radially compresses the gripping portion onto a center conductor received in the gripping portion; and
- wherein the enhanced performance hardline connector assembly is structured and arranged to enhance performance of a hardline cable connection by preventing the nonconductive seizure portion from rotating relative to the first housing portion when the second housing portion is threadedly coupled with the first housing portion so as to prevent marring and/or deformation of the housing engaging portion.

25. The device of claim 24, wherein the nonconductive seizure portion includes a housing engaging portion that extends in a forward direction and is structured and arranged to be received in a longitudinally extending seizure portion engaging portion of the first housing portion before the second housing portion is threadedly coupled with the first housing portion.

26. The device of claim 25, wherein the nonconductive seizure portion includes an additional housing engaging portion that extends in the forward direction and is structured and arranged to be received in the seizure portion engaging portion in the inner wall of the first housing portion after the second housing portion is threadedly coupled with the first housing portion such that the seizure bushing is prevented from rotating relative to the first housing portion.

27. The device of claim 24, wherein the housing engaging portion comprises a fin portion, and the seizure portion engaging portion comprises a longitudinal groove portion.

28. The device of claim 24, wherein the housing engaging portion comprises two diametrically arranged fin portions, and the seizure portion engaging portion comprises two longitudinal groove portions configured to receive the two fin portions.

29. The device of claim 24, wherein the seizure portion comprises a seizure bushing.

30. The device of claim 24, wherein the first portion comprises a front body assembly, the gripping portion comprises a collet portion, and the second portion comprises a mid-body assembly.

31. The device of claim 24, wherein the nonconductive seizure portion is structured and arranged to compress the gripping end of the gripping portion when the second housing portion is threadedly coupled with the first housing portion.

32. The device of claim 24, further comprising:

a third portion that includes a back nut structured and arranged to be threadedly coupled with a rearward end of the second housing portion and to receive the hardline coaxial cable;

wherein the gripping portion includes a first end configured to extend through a nonconductive insulator and to extend from a forward end of the first housing portion and a gripping end configured to receive a center conductor of a hardline coaxial cable;

wherein the insulator includes radially spaced apart inner and outer cylindrical walls connected to one another at a forward end by a radial wall;

wherein the insulator extends from a rearward facing surface of an end wall at the forward end of the first housing portion to a forward facing surface at a forward end of the gripping end of the gripping portion;

wherein the second portion includes a split tube clamp radially surrounding a portion of a conductive metal mandrel and a tubular ramp radially surrounding at least a portion of the clamp;

wherein the third portion includes a seal driver and an O-ring;

wherein the ramp is configured to be moved forward relative to the clamp when the back nut is threadedly coupled with the second housing portion such that the ramp and the clamp are configured to engage one another, thereby causing the clamp to radially compress an outer conductor of the hardline coaxial cable onto the tubular conductive metal mandrel; and wherein the seal driver is configured to be urged in a rearward direction relative to the back nut when the back nut is threadedly coupled with the second housing portion so as to compress the first O-ring to provide a seal between the back nut and the hardline coaxial cable.

33. The device of claim 24, wherein the enhanced performance hardline connector assembly is structured and arranged to achieve a return loss of −30 dB to −35 dB or better over a frequency range of 3 MHz to 5 GHz and a return loss of −20 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

34. The device of claim 24, wherein the enhanced performance hardline connector assembly is structured and arranged to achieve an insertion loss of −0.15 dB or better over a frequency range of 3 MHz to 5 GHz and an insertion loss of −0.2 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

35. The device of claim 24, wherein the longitudinally extending seizure portion engaging portion is disposed in an inner wall of the first housing portion.

36. A device for providing enhanced performance during assembly and/or operation of a hardline connector comprising:

an enhanced performance seizure member comprising:

a forward facing surface having a first forward extending engaging portion that is configured to be received in a seizure member engaging portion in an inner wall of a first connector portion before a second connector portion is threadedly coupled with the first connector portion so as to prevent the seizure member from rotating relative to the first connector portion, and a second engaging portion that extends in the forward direction and is configured to be received in the seizure member engaging portion in the inner wall of the first connector portion after the second connector portion is threadedly coupled with the first connector portion; and wherein the enhanced performance seizure member is structured and arranged to provide enhanced performance of a hardline connector by preventing the seizure member from rotating relative to the first connector portion during operation and/or assembly of the hardline connector, thereby preventing marring and/or deformation of the first engaging portion and the second engaging portion.

37. The device of claim 36, wherein the first forward extending engaging portion comprises a fin portion, and the seizure member engaging portion comprises a longitudinal groove portion.

38. The device of claim 36, wherein the first forward extending engaging portion comprises two diametrically arranged fin portions, and the seizure member engaging portion comprises two longitudinal groove portions configured to receive the two fin portions.

39. The device of claim 36, wherein the enhanced performance seizure member is structured and arranged to compress a gripping portion onto a center conductor of a hardline cable when the second connector portion is threadedly coupled with the first connector portion.

40. The device of claim 36, wherein the enhanced performance seizure member is structured and arranged to be rotatingly fixed with the first connector portion before radially compressing a gripping portion onto a center conductor received in the gripping portion.

41. An enhanced performance hardline connector assembly comprising:

the enhanced performance seizure member of claim 36;

a first connector portion structured and arranged to be coupled with a second connector portion;

wherein the second connector portion is structured and arranged to retain at least a portion of the enhanced performance seizure member during operation and/or assembly of the hardline connector; and wherein the enhanced performance hardline connector assembly is structured and arranged to achieve an insertion loss of −0.15 dB or better over a frequency range of 3 MHz to 5 GHz and an insertion loss of −0.2 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

42. An enhanced performance hardline connector assembly comprising:

the enhanced performance seizure member of claim 36;

a first connector portion structured and arranged to be coupled with a second connector portion;

wherein the second connector portion is structured and arranged to retain at least a portion of the enhanced performance seizure member during operation and/or assembly of the hardline connector; and wherein the enhanced performance hardline connector assembly is structured and arranged to achieve an insertion loss of −0.15 dB or better over a frequency range of 3 MHz to 5 GHz and an insertion loss of −0.2 dB or better over a frequency range of 5 MHz to 6 GHz by preventing the seizure portion from rotating relative to the first housing portion when the second housing portion is being threadedly coupled with the first housing portion, thereby preventing marring and/or deformation of the housing engaging portion so as to minimize peaks and valleys of impedance levels within the hardline connector assembly relative to a predetermined 75 ohm impedance level.

* * * * *